No. 624,314. Patented May 2, 1899.
J. J. FARRAR.
TIRE FOR WHEELS.
(Application filed July 27, 1898.)
(No Model.)

WITNESSES:

INVENTOR
J. J. Farrar.
BY
ATTORNEYS.

THE NORRIS PETERS CO., PHOTO-LITHO., WASHINGTON, D. C.

UNITED STATES PATENT OFFICE.

JOHN J. FARRAR, OF RAPID CITY, SOUTH DAKOTA, ASSIGNOR OF ONE-HALF TO JOHN B. HENRY, OF SAME PLACE.

TIRE FOR WHEELS.

SPECIFICATION forming part of Letters Patent No. 624,314, dated May 2, 1899.

Application filed July 27, 1898. Serial No. 686,984. (No model.)

*To all whom it may concern:*

Be it known that I, JOHN J. FARRAR, of Rapid City, in the county of Pennington and State of South Dakota, have invented a new and Improved Tire for Wheels, of which the following is a full, clear, and exact description.

The object of my invention is to provide a pneumatic tire for wheels in which the tire will be divided into a number of compartments each independent of the other, whereby any one or more of the compartments may be punctured without detracting from the efficiency of the wheel, the wheel being especially adapted for bicycles or for like machines.

Another object of the invention is to provide a means whereby all of the compartments may be filled with air or inflated from one source of air-supply.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
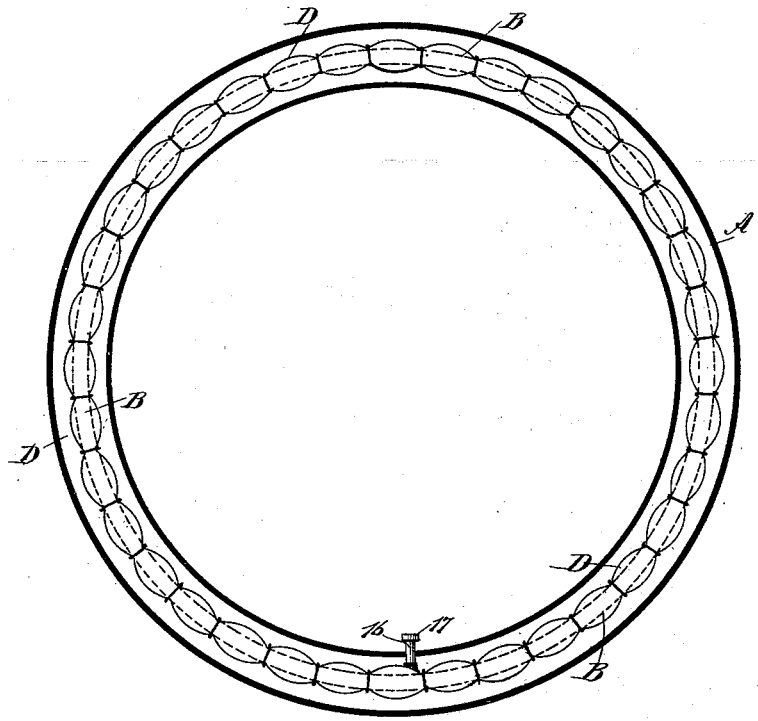
Figure 2:
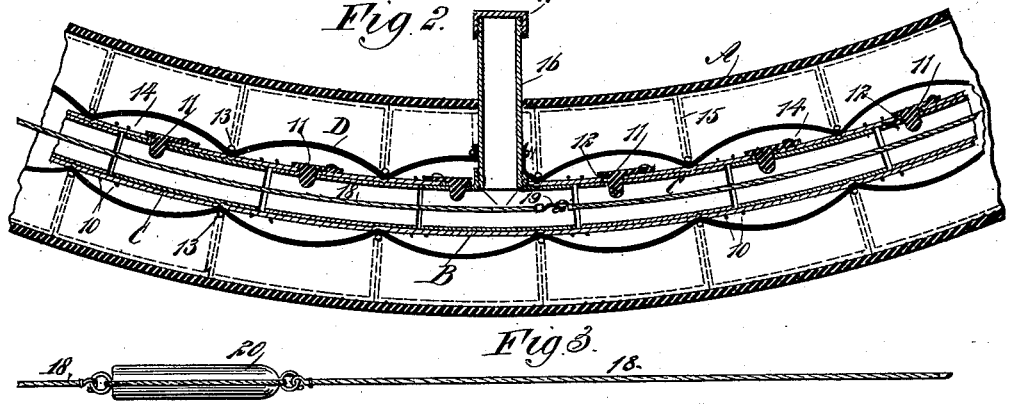
Figure 3:

Figure 1 is a vertical section through a pneumatic tire, illustrating the application of the improved device thereto. Fig. 2 is a vertical longitudinal section through a tire and the improved device applied, the view being drawn on an enlarged scale; and Fig. 3 is a detail view of the device adapted for relieving the tire from air-pressure.

A represents a pneumatic tire of any desired construction. Within the said pneumatic tire A a continuous tube B is separately located, the continuous tube B within the tire being of much smaller diameter than that of the tire, and the said inner tube B may be made of rubber, but when so made is coated with some material that will not allow the inner tube B to expand.

Within the non-expansible tube B a series of thimbles or ferrules C is introduced, the said thimbles or ferrules being preferably made of thin brass or of thin metal of any character, their ends being brought somewhat close together, as shown in Fig. 2. The said thimbles or ferrules near their end portions are preferably exteriorly grooved, in order that said thimbles or ferrules may be bound securely to the inner non-expansible tube B through the medium of threads 10, wire, or equivalent material. Each of the thimbles or ferrules is provided with a valve 11. These valves are secured upon what may be termed the "upper portion" of the non-expansible tube B and are adapted to enter openings 12, made in the said tube and in the said ferrules, the valves 11 being arranged to open outwardly. These valves are constructed of rubber, or other material may be employed, if desired.

In connection with the inner non-expansible tube B an inner inflatable tube D is employed. This tube is preferably made of rubber, and at intervals in its length is secured firmly and in an air-tight manner to the non-flexible tube B by means of a wrapping 13 of wire, cord, or a similar material, or a clamp of any character, whereby the inner inflatable tube D is divided into a number of compartments 14, each of which is independent of the other. Within each compartment 14 of the inflatable tube D a valve 11 is located.

When air under pressure is admitted to the inflatable tube D, each compartment 14 of the tube will be filled with air to such an extent that each compartment of the tube will practically conform to the inner contour of the main outer tube A, and one compartment 14 will have bearing against the other, as shown in dotted lines at 15 in Fig. 2. Air is admitted into the inner inflatable tube D through the medium of a supply-tube 16, which connects with the non-expansible tube B and is of sufficient length to pass out through the main tube A of the tire and through the rim of the wheel to which the tire is applied, the said supply-tube 16 being normally closed by a suitable cap 17. The non-expansible tube B, with its ferrules C, may be termed a "feeding-tube," since it is adapted to supply air to all of the compartments of the inner inflatable tube D.

Preferably a cord 18 is made to pass through the feeding or non-expansible tube B, the ends of the cord being connected by a coupling 19, which may be of a hook-like character, and in connection with this cord a block 20 is employed of such diameter that it may pass through the feeding or non-expansible tube B and engage with the valve 11 and unseat said valve, permitting an egress of air when the cap 17 of the supply-tube 16 is removed, and consequently a deflation of the tire.

In operation when the tire is to be inflated the cap 17 is removed from the supply-tube 16. Air is then forced into the supply-tube and into the feeding-tube, the pressure of air causing the valves 11 to open, consequently admitting the air into the compartments 14 of the inflatable tube D, and when these compartments have been expanded so as to conform to the inner contour of the main or outer tube A of the tire the pressure of air is cut off at the supply-tube 16, whereupon the valves will close and will be held closed by the force of the air contained in the flexible tube around the non-expansible tube, while the air in the non-expansible tube B will be simply at atmospheric pressure. Thus it is obvious that if any one compartment 14 should receive a puncture the air in that particular compartment only would escape, the other compartments remaining intact, so that the wheel, although three or four of the compartments 14 therein be punctured, will be in condition for effective use.

In the event it be desired to deflate the tire the coupling-section 19 of the cord 18 is drawn up and out through the opening provided for the supply-tube 16, the supply-tube having been removed, and the block 20 is attached at its ends to the ends of the cord, whereupon by drawing the block through the feeding or non-expansible tube B the several valves 11, entering the said tube, will be opened and air will escape from the compartments 14 of the flexible tube D and out through the opening provided for the supply-tube 16. When the block 20 reaches the exit-opening in the tire at which the tube 16 is placed, the block may be removed and the ends of the cord again coupled.

By forming the feeding-tube of an outer tube and a series of ferrules, as above described, the said tube will have all the advantages of a rigid tube, and at the same time will be free to yield to all unequalities of the ground that the tire may meet. This construction also permits the inflatable tube D to be firmly and securely fastened at intervals thereto and affords a clear open passage therethrough for the deflating device.

The device is very simple, durable, and economic in its construction and will be found exceedingly efficacious in operation.

Having thus described my invention, I claim as new and desire to secure by Letters Patent—

1. A pneumatic tire for wheels, comprising an outer or tread tube, an inner non-expansible and yielding feed-tube provided with a series of openings, means for supplying air to the feed-tube, an inner inflatable tube surrounding the feed and secured thereto at intervals to form a series of independent compartments, and an outwardly-opening valve in the feed-tube for each of the said compartments, the said valves being secured upon the outer surface of the feed-tube and projecting through the openings of the tube into the interior thereof, substantially as described.

2. A pneumatic tire for wheels, comprising an outer or tread tube, an inner non-expansible and apertured feed-tube formed of an outer tube and metallic thimbles or ferrules, means for supplying air to the feed-tube, an inflatable tube surrounding the feed-tube and secured thereto at intervals to form a series of independent compartments, and an outwardly-opening valve in the feed-tube for each of the said compartments, the said valves projecting through the openings of the feed-tube into the interior thereof, substantially as described.

3. In a pneumatic tire for wheels, the combination with an outer or tread tube, an inner non-expansible feed-tube provided with a series of openings, an inflatable tube divided into independent compartments surrounding the feed-tube, and an outwardly-opening valve for each of the said compartments, said valves projecting through the openings of the tube into the interior thereof, of a cord provided with couplings and arranged within the feed-tube, and a block adapted for attachment to said cord and to be drawn through the feed-tube to engage the said valves and force them from their seats, substantially as described.

4. In a pneumatic tire for wheels, the combination with an outer or tread tube, an inner non-expansible feed-tube formed of a tube and a series of thimbles or ferrules therein, and provided with a plurality of openings, means for supplying air to the feed-tube, an inflatable tube surrounding the feed-tube and tied thereto at intervals to form a series of independent compartments, and an outwardly-opening valve for each of said compartments, said valves being secured to the outer surface of the feed-tube and projecting through the openings thereof into the interior of the tube, of a cord arranged in the feed-tube, and a block secured to said cord and adapted to be drawn through the feed-tube into engagement with the valves to open the same, substantially as herein shown and described.

JOHN J. FARRAR.

Witnesses:
A. K. GARDNER,
EARL W. ALLEN.